US012587402B2

(12) United States Patent
Yelahanka Raghuprasad et al.

(10) Patent No.: US 12,587,402 B2
(45) Date of Patent: Mar. 24, 2026

(54) ESTIMATING USER SUITABILITY FOR COLLECTING APPLICATION QoE FEEDBACK

(71) Applicant: Cisco Technology, Inc., San Jose, CA (US)

(72) Inventors: Mukund Yelahanka Raghuprasad, San Jose, CA (US); Jean-Philippe Vasseur, Combloux (FR); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 15 days.

(21) Appl. No.: 18/588,679

(22) Filed: Feb. 27, 2024

(65) Prior Publication Data

US 2025/0274301 A1 Aug. 28, 2025

(51) Int. Cl.
| | |
|---|---|
| *H04L 12/18* | (2006.01) |
| *H04L 41/50* | (2022.01) |
| *H04L 41/5003* | (2022.01) |
| *H04L 43/087* | (2022.01) |

(52) U.S. Cl.
CPC ...... *H04L 12/1827* (2013.01); *H04L 41/5003* (2013.01); *H04L 41/509* (2013.01); *H04L 43/087* (2013.01)

(58) Field of Classification Search
CPC ............. H04L 12/1827; H04L 41/5003; H04L 41/509; H04L 43/087
See application file for complete search history.

(56) References Cited

U.S. PATENT DOCUMENTS

| | | | | |
|---|---|---|---|---|
| 7,519,562 | B1 * | 4/2009 | Vander Mey | G06Q 99/00 |
| | | | | 705/500 |
| 2005/0154557 | A1 * | 7/2005 | Ebert | G06F 11/3438 |
| | | | | 702/182 |
| 2016/0283497 | A1 * | 9/2016 | Singh | G06F 16/35 |
| 2018/0204129 | A1 * | 7/2018 | Vasseur | G06N 20/00 |
| 2019/0037002 | A1 * | 1/2019 | Arunachalam | H04L 43/04 |
| 2021/0150595 | A1 | 5/2021 | Pillai et al. | |
| 2021/0314238 | A1 * | 10/2021 | Cioffi | H04L 41/5067 |
| 2022/0150151 | A1 | 5/2022 | Ramamoorthy et al. | |
| 2022/0198361 | A1 * | 6/2022 | Jain | G06Q 10/06393 |
| 2022/0400065 | A1 | 12/2022 | Cioffi et al. | |
| 2023/0113822 | A1 | 4/2023 | Li et al. | |
| 2023/0222114 | A1 * | 7/2023 | Zack | G06F 16/24578 |
| | | | | 707/690 |
| 2023/0229973 | A1 * | 7/2023 | Elisha | G06N 5/04 |
| | | | | 706/12 |
| 2023/0300039 | A1 | 9/2023 | Kersch et al. | |

* cited by examiner

*Primary Examiner* — Kamal M Hossain
(74) *Attorney, Agent, or Firm* — Merchant & Gould P.C.; Kenneth J. Heywood

(57) ABSTRACT

In one embodiment, a device obtains telemetry data regarding an interaction between a user and an online application. The device also obtains a satisfaction rating provided by the user regarding the interaction. The device makes, based on the telemetry data and the satisfaction rating, a suitability assessment as to how suitable the interaction is for training a machine learning model to predict a quality of experience metric for the online application. The device prevents the telemetry data and satisfaction rating from being used to train the machine learning model, when the suitability assessment indicates that the interaction is unsuitable for training the machine learning model.

20 Claims, 11 Drawing Sheets

REMOTE SITE 302

Int 1

Int 2

Int 3

110

ISP 1 306a

ISP 2 306b

ISP 3 306d

MPLS 306c

SaaS PROVIDERS(S) 308

REGIONAL HUB 304

310

400

SDN CONTROLLER
408

SD-WAN
FABRIC
404

SD-WAN
SERVICE POINT
406

110b

110a

LAN CORE
402

500

Application Experience Optimization Process  248

User Telemetry Collector  502

User Interaction Encoder  504

Suitability Estimator  506

Feedback Flow Estimator  508

QoE Model  510

Network Telemetry  512

Application Telemetry  514

User Feedback  516

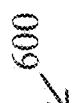

600

Mutual Information 0.8  0.7  0.6  0.5  0.4  0.3

604

602

System CPU Usage
Process CPU Usage
Video Frame Rate
Video Frame Resolution
Video Packet Loss
Video Jitter
Video Delay
Video RX Media bitrate
Audio Packet Loss
Audio Jitter
Audio Delay
Audio RX Media bitrate System Video Audio System CPU Usage
Process CPU Usage
Video Frame Rate
Video Frame Resolution
Video Packet Loss
Video Jitter
Video Delay
Video RX Media bitrate
Audio Packet Loss
Audio Jitter
Audio Delay
Audio RX Media bitrate System Video Audio

FIG. 6A

ESTIMATING USER SUITABILITY FOR COLLECTING APPLICATION QoE FEEDBACK

TECHNICAL FIELD

The present disclosure relates generally to computer networks, and, more particularly, to estimating user suitability for collecting application quality of experience (QoE) feedback.

BACKGROUND

Traditionally, network service level agreement (SLA) thresholds have been used as a proxy for the true quality of experience (QoE) of an online application from the perspective of the end user. In other words, it is assumed that if the SLA is being violated (e.g., packet loss exceeds the SLA threshold), the QoE of the application is also degraded and users of the application will have unsatisfactory experiences with the application. While this may hold true in clear situation of network impairment, some of the more complex types of impairments could go unnoticed by network systems. In addition, these approaches also fail to take into account the behaviors and actions of the users and of the application itself, which can also affect the true QoE.

Estimating accurate QoE metrics for a user of an online application is complicated because of the degrees-of-freedom that pertain to the interactions of that user with the application. For example, in the case of a video conferencing application, the behavior of the application can vary significantly for a meeting with two attendees compared to a meeting with ten attendees. The subjective nature of the perceived experiences of the users further complicates the task of using a singular model to estimate the QoE across all users.

Even in cases where it becomes possible to train a QoE model based on real user feedback, simply collecting user feedback labels without any regard to the suitability of those labels for model training can also lead to poor performance of the resulting model. Indeed, factors such as the diversity of the user interactions associated with the labels, the reliability of the labels, etc., can greatly affect the performance of the QoE model.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6B illustrate example matrices of the mutual information between telemetry data and different impairments.

DESCRIPTION OF EXAMPLE EMBODIMENTS

Overview

Figure 1A:
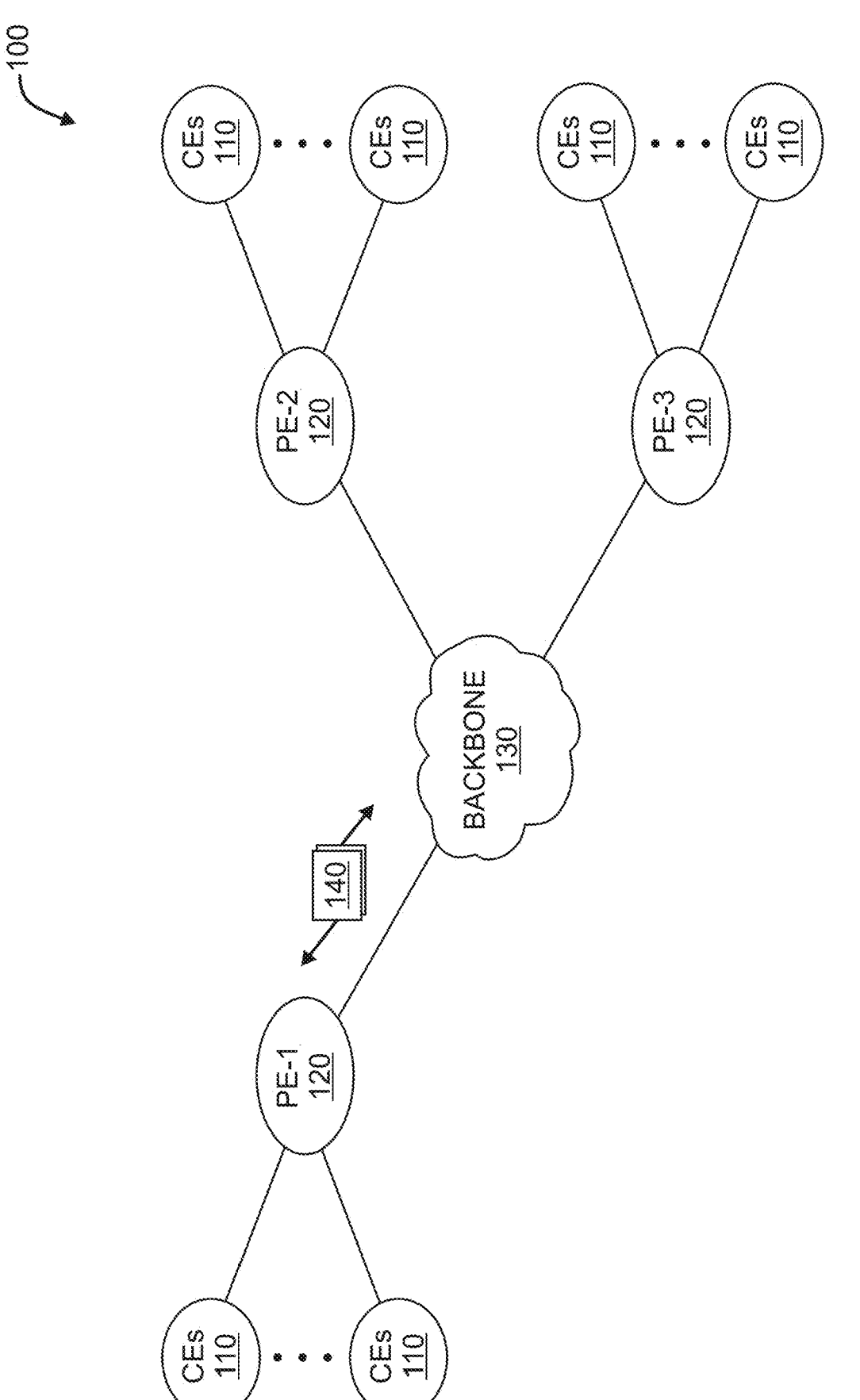
FIGS. 1A-1B illustrate an example communication network.

According to one or more embodiments of the disclosure, a device obtains telemetry data regarding an interaction between a user and an online application. The device also obtains a satisfaction rating provided by the user regarding the interaction. The device makes, based on the telemetry data and the satisfaction rating, a suitability assessment as to how suitable the interaction is for training a machine learning model to predict a quality of experience metric for the online application. The device prevents the telemetry data and satisfaction rating from being used to train the machine learning model, when the suitability assessment indicates that the interaction is unsuitable for training the machine learning model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
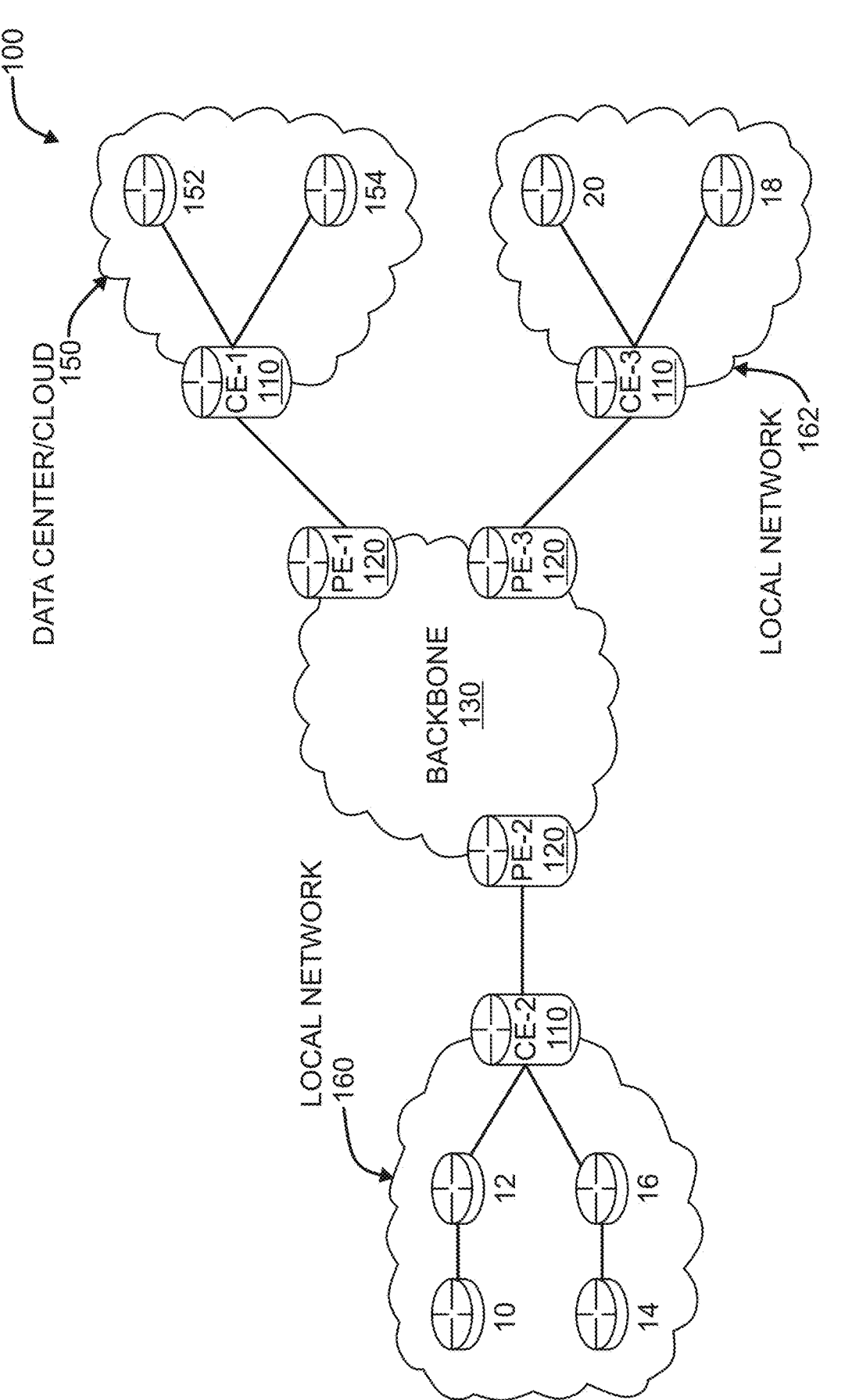

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
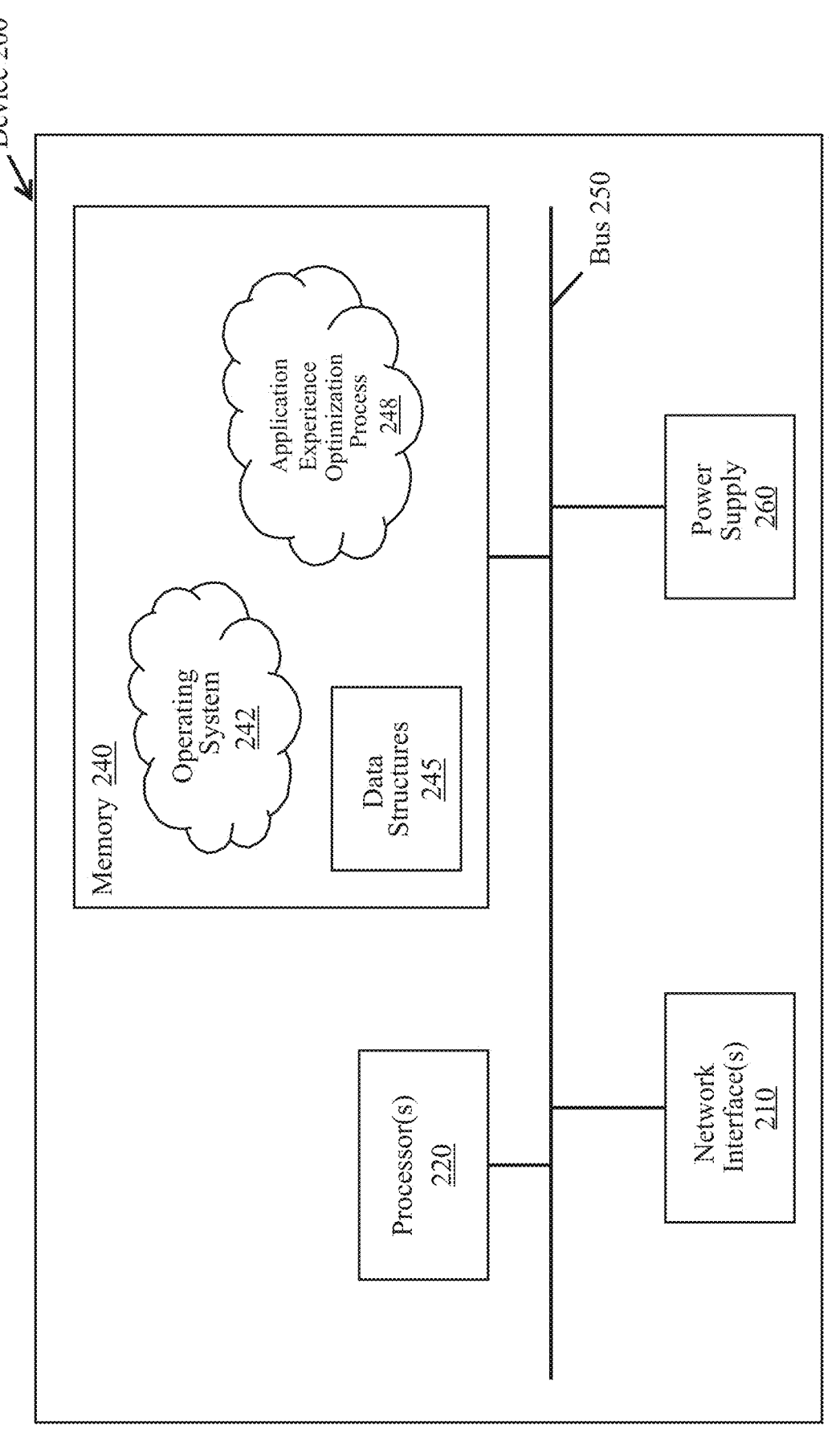
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, application experience optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, application experience optimization process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QOS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
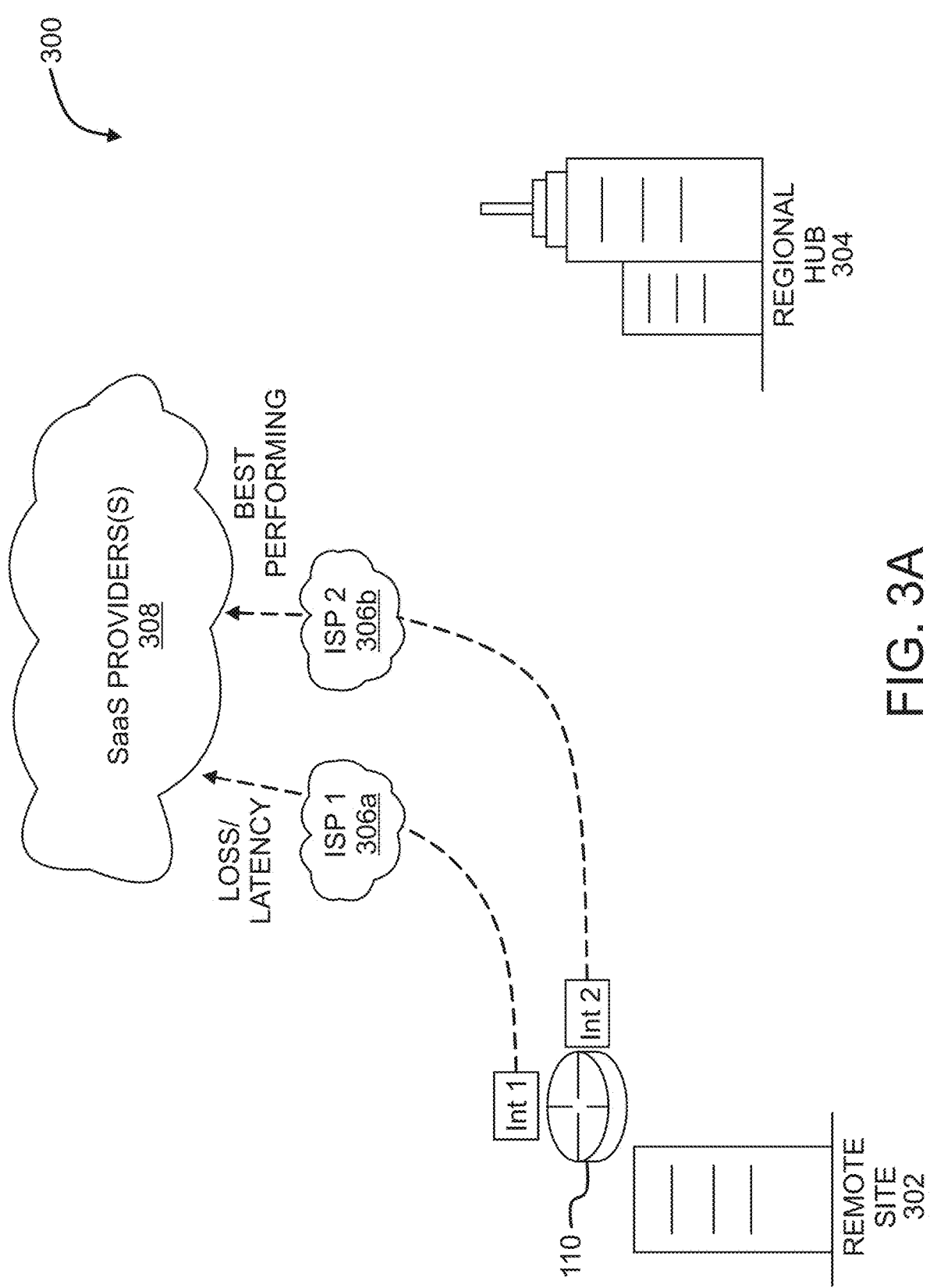
FIGS. 3A-3B illustrate example network deployments.
Figure 3B:
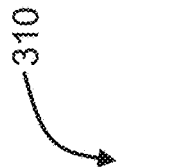

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
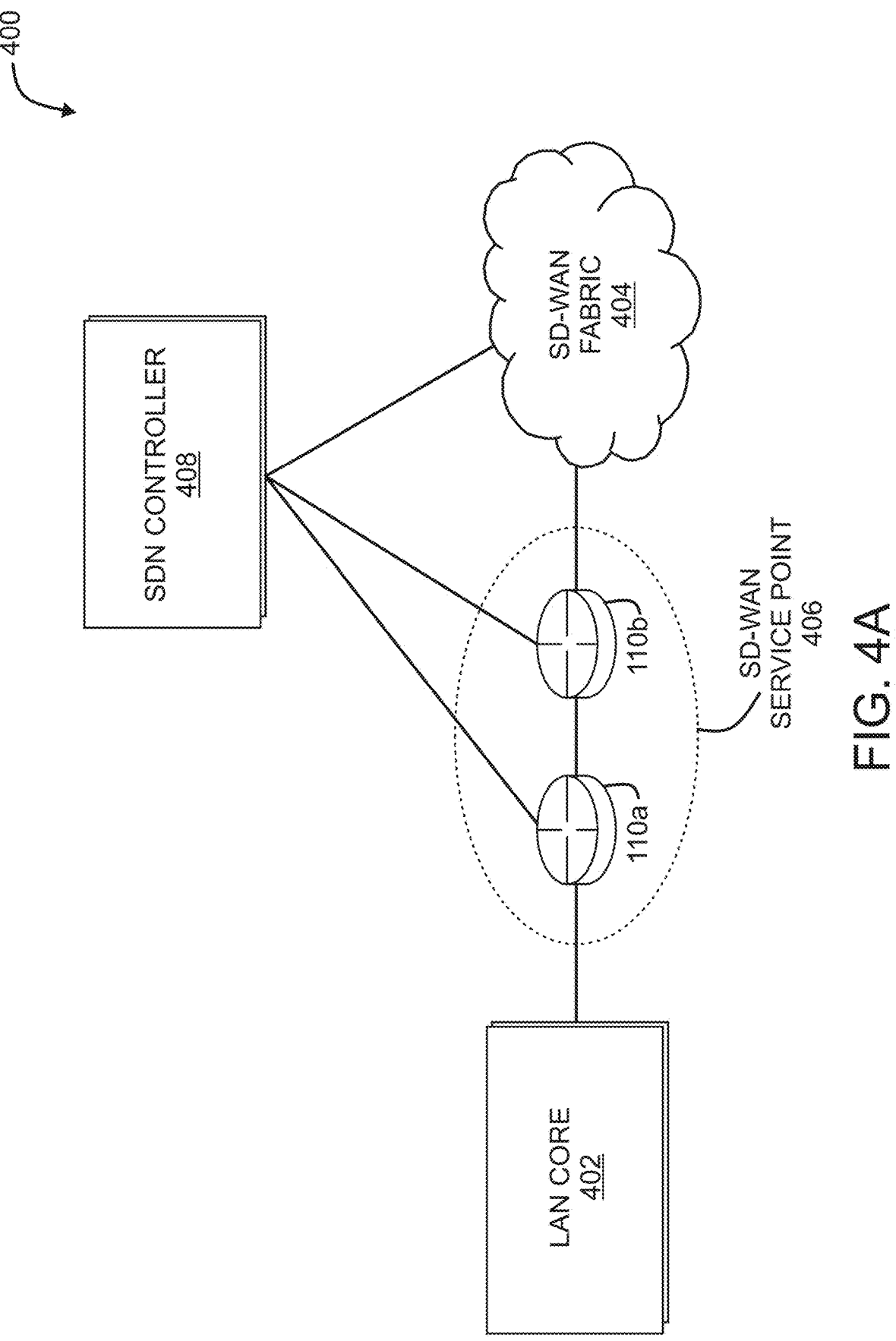
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds,

Routing is still entirely reactive: decisions are made using probes that reflect the status of a path at a given time, in contrast with the notion of an informed decision, SLA failures are very common in the Internet and a good proportion of them could be avoided (e.g., using an alternate path), if predicted in advance.

Figure 4B:
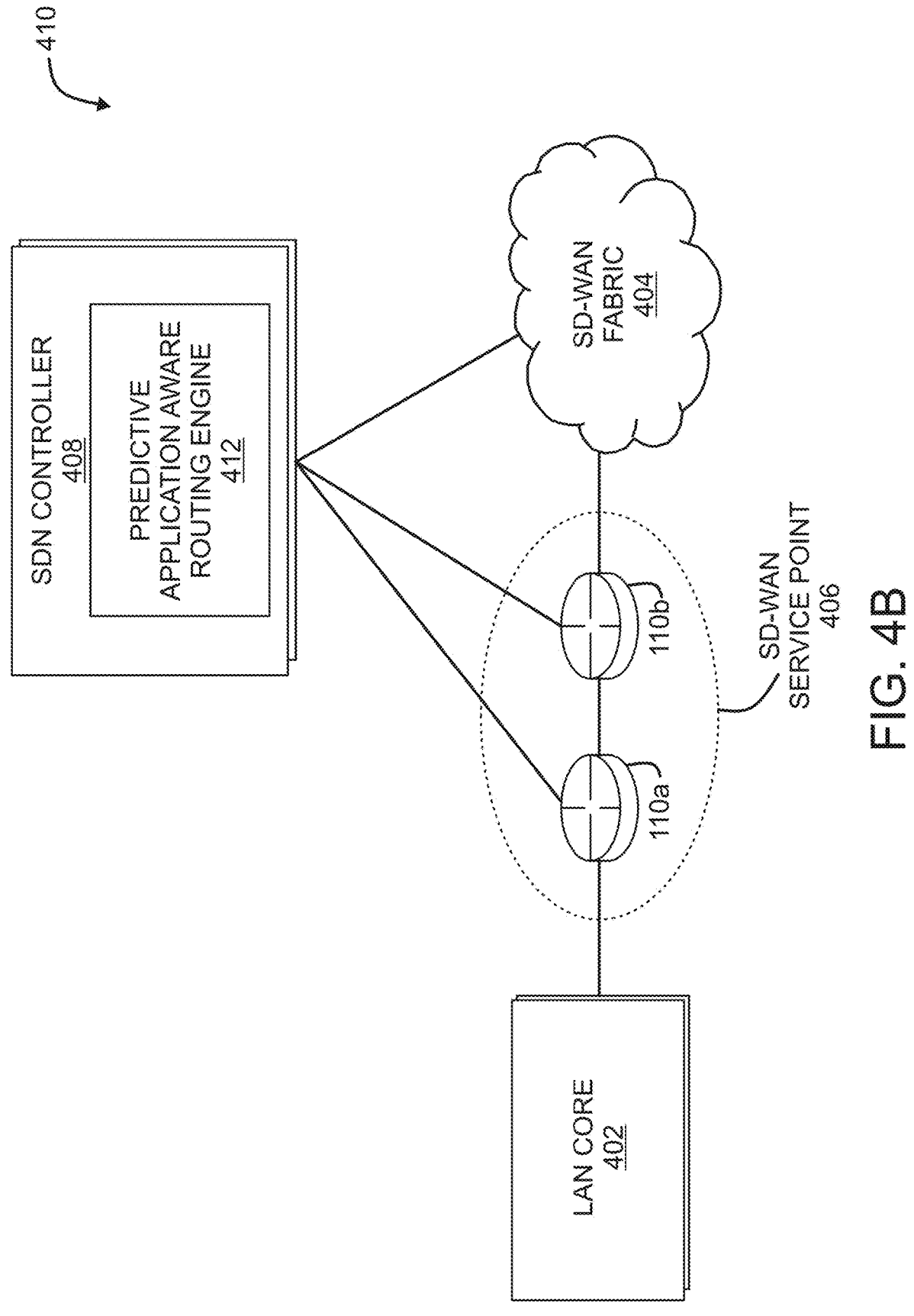

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g., often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g., PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, cognitive networks represent an evolution over existing networking techniques by focusing on the true user experience/QoE of an online application, rather than attempting to infer this information from proxy information, such as SLA violations (e.g., real SLA violations detected in the network or SLA violations predicted by a predictive network system). The scope of cognitive networks is also not specific to just voice and video applications and can be expanded to other types of applications, as well.

However, estimating accurate application QoE metrics for a user is complicated because of the degrees-of-freedom that pertains to a user's interaction with an application. For example, in the case of a video conferencing application, the behavior of the application can vary significantly for a meeting with two attendees compared to a meeting with ten attendees. Further difference in behavior may exist depending on the location of the users involved, the Internet Service Providers (ISPs) to which they are connected, the number of participants speaking, etc. The subjective nature of their perceived experiences further complicates the task of estimating the QoE across all of the individual users using a single model.

One solution to this problem is to collect more labels that cover most of the nuances in a user's interaction and the user's perception. It is thus important to collect labels from a "diverse" set of user interactions. It is also important to consider the "reliability" of these labels to preserve the accuracy of the resulting model. The reliability estimate of a user label should also be robust enough to account for the subjectivity in user perception. Indeed, a group of users may find a certain application behavior acceptable under a given condition, bit may not find the same application behavior acceptable under different conditions. For example, consider the case of a user of a video conferencing application faced with network degradation in their uplink connection, while having acceptable performance for their downlink connection. This condition may lead to an acceptable QoE when the user is primarily a listener in the video conference, but a bad QoE when the user is primarily a speaker. Such nuances should be considered when estimating the reliability of user labels. In other words, the suitability of the user feedback labels should account for factors such as their "uniqueness" and "reliability," so that the resulting QoE model takes into account both the application behavior and the nuances of user-interaction with the application.

——Estimating User Suitability for Collecting Application QoE Feedback——

The techniques herein introduce a system to estimate the suitability of a user for collection application QoE. To do so, in some implementations, the system herein may estimate the "uniqueness" of the user's interaction with the application. In further implementations, the system may do so by estimating the "reliability" of the user's QoE label for an interaction. The techniques herein also introduce a mechanism by which such measures can be used to train a machine learning model that makes use of the user labels. The system may also employ a control loop that uses the obtained information to influence further user label collection, so as to collect more suitable labels over time (e.g., to collect more reliable and diverse labels).

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device obtains telemetry data regarding an interaction between a user and an online application. The device also obtains a satisfaction rating provided by the user regarding the interaction. The device makes, based on the telemetry data and the satisfaction rating, a suitability assessment as to how suitable the interaction is for training a machine learning model to predict a quality of experience metric for the online application. The device prevents the telemetry data and satisfaction rating from being used to train the machine learning model, when the suitability assessment indicates that the interaction is unsuitable for training the machine learning model.

Figure 5:
FIG. 5 illustrates an example architecture for estimating user suitability for collecting application quality of experience (QoE) feedback.

Operationally, FIG. 5 illustrates an example architecture 500 for estimating user suitability for collecting application quality of experience (QoE) feedback, according to various embodiments. At the core of architecture 500 is application experience optimization process 248, which may be executed by a controller for a network or another device in communication therewith. For instance, application experience optimization process 248 may be executed by a controller for a network (e.g., SDN controller 408 in FIGS. 4A-4B, such as part of predictive application aware routing engine 412), a particular networking device in the network (e.g., a router, a firewall, etc.), a server, another device or service in communication therewith, or the like.

As shown, application experience optimization process 248 may include any or all of the following components: user telemetry collector 502, user interaction encoder 504, suitability estimator 506, feedback flow estimator 508, and/or QoE model 510. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

In various implementations, application experience optimization process 248 may obtain any or all of the following types of information, to support the operations of QoE model 510:

Network telemetry 512—such telemetry may be generated by one or more routers or other networking devices in the network (e.g., the CE router associated with a given endpoint client, etc.), an agent on the endpoint itself, or any other device in the network, and indicate performance metrics such as path loss, latency, jitter, etc. In various embodiments, network telemetry 512 may also include traceroute information captured by agents (e.g., ThousandEyes agents, etc.) executed by these devices performing path tracing/probing.

Application telemetry 514—In addition to obtaining network telemetry 512, application experience optimization process 248 may also obtain telemetry data generated by the online application of interest, itself. For instance, such telemetry may indicate the specific interactions of a user within the application (e.g., speaker/listener status within a video conferencing application, the device used by the user, the number of participants of the video conference, etc.). In some instances, application telemetry 514 may also include in-application metrics or parameters, such as concealment time, etc.

User feedback 516—This information can be collected either directly within the application, if supported, or via an outside mechanism such as an external agent or chatbot, user surveys, or the like. In general, user feedback 516 may be indicative of the subjective views of a user as to whether they believe their application experience to be acceptable or unacceptable. To this end, user feedback 516 may take any number of forms, such as, but not limited to, ratings on a predefined scale (e.g., 0-5 stars), binary values (e.g., a thumbs up or thumbs down rating), textual feedback, or any other form of feedback indicative of their experience.

In accordance with the teachings above, application experience optimization process 248 may use network telemetry 512, application telemetry 514, and user feedback 516 to train QoE model 510 to predict the QoE for one or more applications. In turn, application experience optimization process 248 may use the QoE predictions for purposes such as identifying issues in the network, within the application itself, or at the endpoint client. In some instances, application experience optimization process 248 may also use the QoE predictions by QoE model 510 to enact corrective measures such as initiating a reroute of the application traffic, sending an alert or suggestion to a user or administrator, etc.

In various implementations, user telemetry collector 502 may take as input as input application telemetry 514 for different users including information regarding their interactions with the application. If available, user telemetry collector 502 may also take as input network telemetry 512 and/or user feedback 516. In turn, user telemetry collector 502 may organize this telemetry on a per-user basis, thereby associating the QoE labels from the user with their interactions within the application, as well as any other relevant factors (e.g., their ISP, their location, etc.), that could also affect the behavior of the application. During execution, user telemetry collector 502 may also aggregate and normalize the telemetry collected in any manner required for analysis.

During execution user interaction encoder 504 may take as input the telemetry collected by user telemetry collector 502 and produce representations of the user interactions. In general, the purpose of this representation is to allow application experience optimization process 248 to compare/study the user interactions of many different application users across the network. In some implementations, the representations may be such that two user interactions that are very similar to each other also have similar representations and should not lose information on the important aspects of the observed user interaction.

In one embodiment, user interaction encoder 504 may construct the representations of the user interactions by computing mutual information measures across their telemetry data. Generally, the mutual information between two variables is defined as the reduction in uncertainty about variable X given knowledge of Y, or vice versa. Thus, a high mutual information between any two of the metrics in the telemetry from user telemetry collector 502 implies that the two metrics are highly related to each other (e.g., they may possibly influence each other or be influenced by the same external cause). Accordingly, user interaction encoder 504 may encode various aspects of the user interactions by computing the mutual information between various metrics available in the telemetry. Of course, user interaction encoder 504 could also compute the representations in other suitable ways, as well.

Figure 6B:
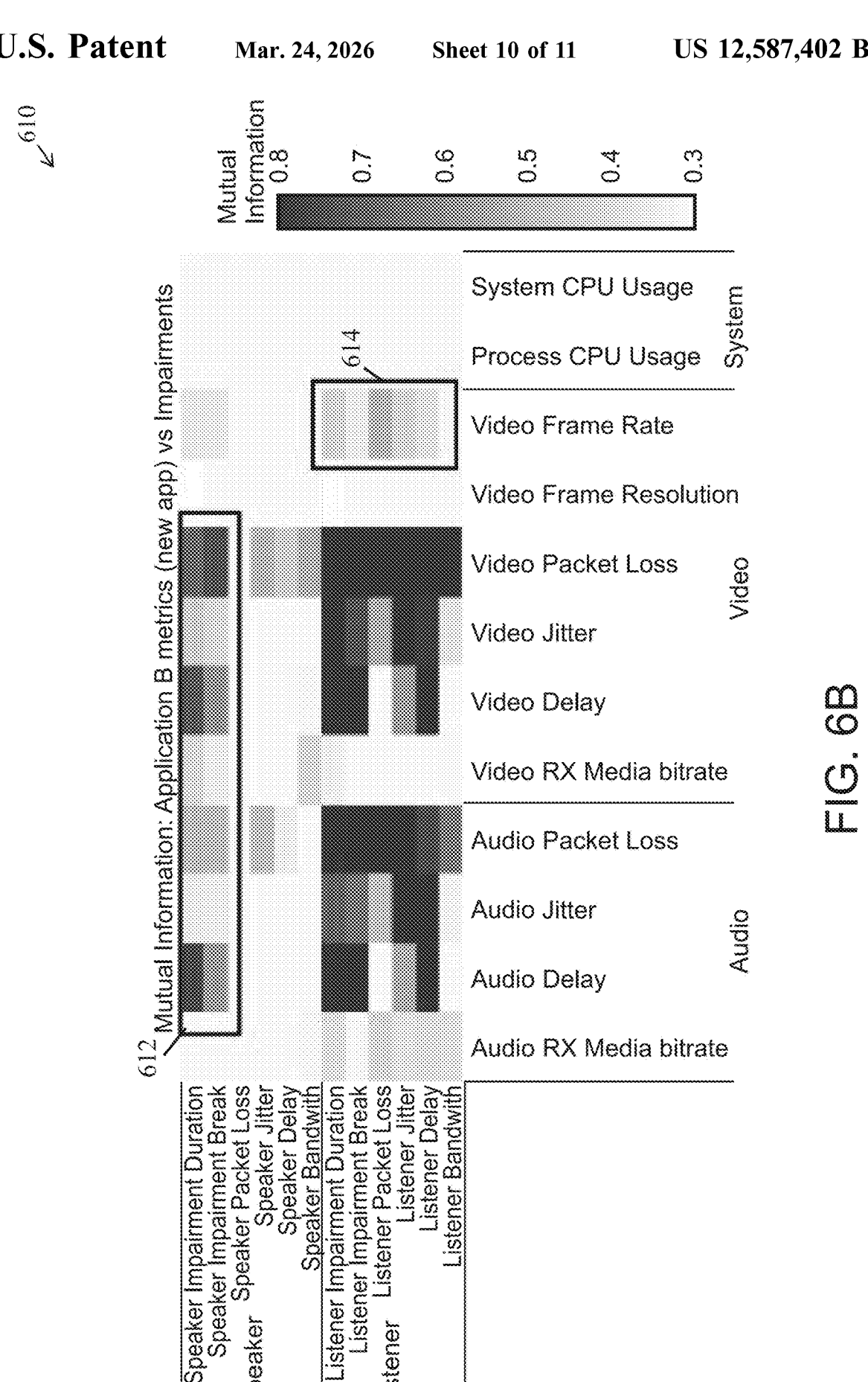

By way of example, FIGS. 6A-6B illustrate example matrices of the mutual information between telemetry data and different impairment. As shown in FIG. 6A, consider the case of a video conferencing application. In such a case, matrix 600 shows the pairwise mutual information between various application-level metrics. This matrix now represents the application behavior showing the dependencies between the application metrics. More specifically, the application metrics are plotted on both the x-axis and y-axis of matrix 600, with the mutual information between the two listed in each cell of matrix 600. For simplicity, the upper half of matrix 600 is omitted since the same values would also appear in those cells.

From regions 602-604 of matrix 600, it can be seen that there is a strong relationship between audio packet-loss and jitter and video framerate. This implies that the user may suffer QoE degradation (frame rate) due to degradation in the network (loss and jitter).

FIG. 6B illustrates another matrix 610 showing the mutual information computed between various network layer metrics (Layer 3) with the corresponding application metrics (Layer 7). The network impairment metrics are considered on the networks of both the speaker and the listener in a video conference. Here, matrix 610 represents the variation in application behavior (Layer 7) with respect to the underlying network (Layer 3). More specifically, the x-axis of matrix 610 shows the common application metrics and the y-axis shows the network impairment metrics.

From regions 612-614, it can be seen that the network impairments on the network of the speaker can cause variation in the application behavior for the listener. In addition, it can also be seen that the network of the listener can influence the application behavior for the listener.

Referring again to FIG. 5, user interaction encoder 504 could also simply form the representations by performing dimensionality reduction on the collected telemetry from user telemetry collector 502. In such a case, the dimensionality reduction may include converting user interactions that are very similar to each other into points that are close to each other in a reduced latent space. Such a representation can help quantify uniqueness of a user interaction considering all possible data points.

In one embodiment, user interaction encoder 504 may use any of various forms of supervised or unsupervised representation learning where each of the approaches encode different aspects of user interactions. It should also be noted that the representations could also be learned from both labelled and unlabeled user interactions.

During execution, suitability estimator 506 may take as input the representations of the user interactions from user interaction encoder 504 and estimate the uniqueness and reliability scores for the labels obtained from users (e.g., from user feedback 516). In general, the purpose of the uniqueness score is to determine whether a particular user interaction is unique or under-represented among the set of labels obtained. For example, consider a video conferencing application whereby a user interaction entails a user engaging in a call with four participants. Such a user interaction is likely to be far less unique than the user engaged in a call with 100 participants. Here, it may be more suitable to collect additional labels (e.g., user feedback 516) for user interactions that would still contribute towards a diverse training dataset for QoE model 510. Suitability estimator 506 may also use the uniqueness score to assign a higher importance to the labels corresponding to unique user interactions during training, as well.

The reliability score, on the other hand, estimates the amount of noise associated with a given label from user feedback 516. Another approach might also be to provide estimates of the prediction score that considers the uniqueness score (e.g., the model may explicitly indicate a lower prediction confidence score if the uniqueness score is higher than a specific threshold). In another embodiment, model predictions may be filtered (discarded) if the uniqueness score is too high. This score can also be designed to estimate various factors. One such factor could be to measure how consistent a user's evaluation is given similar underlying application conditions. Another factor would be to measure the data quality of the application metrics that correspond to a given user interaction. Labels which have low reliability can thus be discarded from the training process.

In one of the embodiments, suitability estimator 506 may compute the uniqueness score by assessing the reduced latent dimensions of user interaction representations. In turn, suitability estimator 506 may give a higher uniqueness score to user interactions that are encoded further from the general population of user interactions. This could be computed using the average of the pairwise distances for a point in the latent space.

In another embodiment, suitability estimator 506 may use factors such as the user location, ISP etc., to determine whether there enough samples belonging to the category. For example, user interactions from a city like New York may be less unique relative to user interactions from St. Louis. With respect to the reliability score, in one embodiment suitability estimator 506 could compute reliability as a measure of variance in the labels collected for similar user interactions. Given the user interaction representations, suitability estimator 506 could also use metrics like the silhouette score (with QoE label as cluster labels) to measure the consistency of the user's evaluation under similar application behavior. In another embodiment, suitability estimator 506 may compute a data quality measure such as the fraction of missing values computed on the application telemetry as the reliability measure.

In some cases, suitability estimator 506 may also compute interpretability metrics for the estimated score for each user interaction label. These metrics can be used by feedback flow estimator 508 to explain the estimates generated by the system, as detailed below.

Finally, feedback flow estimator 508 may take as input the measures of suitability from suitability estimator 506 (e.g., uniqueness and reliability scores) and their corresponding interpretability metrics, if any. In some instances, feedback flow estimator 508 may present the estimated scores for a single user or group of users to a user interface, along with explanations as to why a particular user or a group of users were assigned a particular score.

In some instances, feedback flow estimator 508 may also provide information on the type of user interactions that have plenty of labels and the type of user interactions that have too few labels. Scarcity of labels for a certain type of user interaction would imply that any machine learning model may not perform well for that type of user interaction. Such information can be incorporated in the training where underrepresented user interactions maybe given a higher weight in training. The reliability score may also be used in training where a particular label is not used for training if the reliability of the label is low. Feedback flow estimator 508 may propagate the suitability scores (e.g., the uniqueness and reliability scores) to any machine learning framework configured to train or retrain QoE model 510, which may incorporate it into the training.

Another potential function of feedback flow estimator 508 may be to influence future label collections based on the suitability metrics. For instance, if a user consistently provides labels/user feedback 516 with low reliability or has the type of interactions which have a low uniqueness score, feedback flow estimator 508 may prevent that user from being asked for user feedback 516 entirely or less frequently.

Thus, feedback flow estimator 508 may provide an overview of the uniqueness, reliability, or other suitability of a set of labels collected, allowing this information to be used during training of QoE model 510 and/or influencing further collection of user feedback 516 from users of the application.

Figure 7:
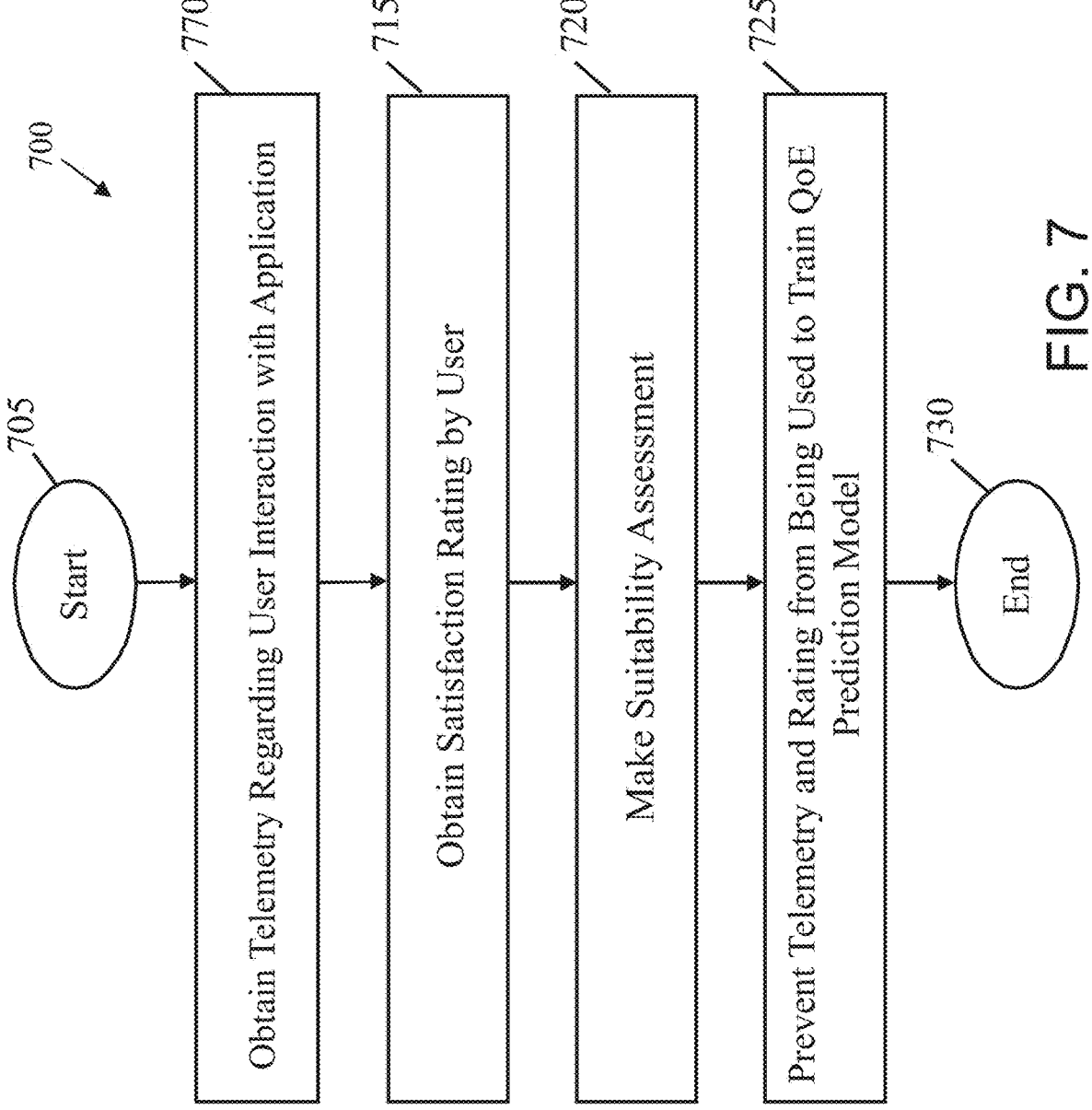
FIG. 7 illustrates an example simplified procedure for estimating user suitability for collecting application QoE feedback.

FIG. 7 illustrates an example simplified procedure 700 (e.g., a method) for estimating user suitability for collecting application quality of experience (QoE) feedback, in accordance with one or more embodiments described herein. For example, a non-generic, specifically configured device (e.g., device 200), such as a router, firewall, controller for a network (e.g., an SDN controller or other device in communication therewith), server, or the like, may perform procedure 700 by executing stored instructions (e.g., application experience optimization process 248). The procedure 700 may start at step 705, and continues to step 710, where, as described in greater detail above, the device may obtain telemetry data regarding an interaction between a user and an online application. In some cases, the online application is a conferencing application and the interaction corresponds to a number of participants during a call or whether the user was a speaker or listener during the call.

At step 715, as detailed above, the device may obtain a satisfaction rating provided by the user regarding the interaction. In various implementations, the satisfaction rating is captured by the online application or by an agent associated with an endpoint operated by the user.

At step 720, the device may make, based on the telemetry data and the satisfaction rating, a suitability assessment as to how suitable the interaction is for training a machine learning model to predict a quality of experience metric for the online application, as described in greater detail above. In some implementations, the device may do so by determining how unique the interaction is relative to other interactions between other users and the online application. In various implementations, the device may determine how unique the interaction is by assessing how unique a location or service provider associated with the user is relative to that of the other users. In further implementations, the device may make the suitability assessment by determining how reliable the satisfaction rating is based on an amount of noise associated with the satisfaction rating and one or more other satisfaction ratings for interactions of a same type as the interaction between the user and the online application. In some implementations, the device may make the suitability assessment by computing mutual information measures between different metrics from the telemetry data.

At step 725, as detailed above, the device may prevent the telemetry data and satisfaction rating from being used to train the machine learning model, when the suitability assessment indicates that the interaction is unsuitable for training the machine learning model. In various implementations, the device may also control when the user or another user of the online application is asked to provide a further satisfaction rating, based on the suitability assessment. In some implementations, a network controller uses the quality of experience metric predicted by the machine learning model to control a routing decision for network traffic associated with the online application. In some cases, the device may also provide an indication of the suitability assessment to a user interface.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for estimating user suitability for collecting application quality of experience (QoE) feedback, it is to be understood that various other adaptations and modifications may be made within the spirit and scope of the embodiments herein. For example, while certain embodiments are described herein with respect to using certain models for purposes of predicting application experience metrics (e.g., QoE metrics), SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

obtaining, by a device, telemetry data regarding an interaction between a user and an online application that includes performance metrics for network traffic associated with the interaction;

obtaining, by the device, a satisfaction rating provided by the user regarding the interaction;

making, by the device and based on the telemetry data and the satisfaction rating, a suitability assessment as to how suitable the interaction is for training a machine learning model to predict a quality of experience metric for the online application; and preventing, by the device, the telemetry data and satisfaction rating from being used to train the machine learning model, when the suitability assessment indicates that the interaction is unsuitable for training the machine learning model.

2. The method as in claim 1, wherein the satisfaction rating is captured by the online application or by an agent associated with an endpoint operated by the user.

3. The method as in claim 1, wherein making the suitability assessment comprises:

determining how unique the interaction is relative to other interactions between other users and the online application.

4. The method as in claim 3, wherein determining how unique the interaction is relative to other interactions between other users and the online application comprises:

assessing how unique a location or service provider associated with the user is relative to that of the other users.

5. The method as in claim 1, further comprising:

controlling when the user or another user of the online application is asked to provide a further satisfaction rating, based on the suitability assessment.

6. The method as in claim 1, wherein making the suitability assessment comprises:

determining how reliable the satisfaction rating is based on an amount of noise associated with the satisfaction rating and one or more other satisfaction ratings for interactions of a same type as the interaction between the user and the online application.

7. The method as in claim 1, wherein a network controller uses the quality of experience metric predicted by the machine learning model to control a routing decision for network traffic associated with the online application.

8. The method as in claim 1, wherein making the suitability assessment comprises:

computing mutual information measures between different metrics from the telemetry data.

9. The method as in claim 1, further comprising:

providing, by the device, an indication of the suitability assessment to a user interface.

10. The method as in claim 1, wherein the online application is a conferencing application and the interaction corresponds to a number of participants during a call or whether the user was a speaker or listener during the call.

11. An apparatus, comprising:

one or more network interfaces;

a processor coupled to the one or more network interfaces and configured to execute one or more processes; and a memory configured to store a process that is executable by the processor, the process when executed configured to:

obtain telemetry data regarding an interaction between a user and an online application that includes performance metrics for network traffic associated with the interaction;

obtain a satisfaction rating provided by the user regarding the interaction;

make, based on the telemetry data and the satisfaction rating, a suitability assessment as to how suitable the interaction is for training a machine learning model to predict a quality of experience metric for the online application; and prevent the telemetry data and satisfaction rating from being used to train the machine learning model, when the suitability assessment indicates that the interaction is unsuitable for training the machine learning model.

12. The apparatus as in claim 11, wherein the satisfaction rating is captured by the online application or by an agent associated with an endpoint operated by the user.

13. The apparatus as in claim 11, wherein the apparatus makes the suitability assessment by:

determining how unique the interaction is relative to other interactions between other users and the online application.

14. The apparatus as in claim 13, wherein the apparatus determines how unique the interaction is relative to other interactions between other users and the online application by:

assessing how unique a location or service provider associated with the user is relative to that of the other users.

15. The apparatus as in claim 11, wherein the process when executed is further configured to:

control when the user or another user of the online application is asked to provide a further satisfaction rating, based on the suitability assessment.

16. The apparatus as in claim 11, wherein the apparatus makes the suitability assessment by:

determining how reliable the satisfaction rating is based on an amount of noise associated with the satisfaction rating and one or more other satisfaction ratings for interactions of a same type as the interaction between the user and the online application.

17. The apparatus as in claim 11, wherein a network controller uses the quality of experience metric predicted by the machine learning model to control a routing decision for network traffic associated with the online application.

18. The apparatus as in claim 11, wherein the apparatus makes the suitability assessment by:

computing mutual information measures between different metrics from the telemetry data.

19. The apparatus as in claim 11, wherein the process when executed is further configured to:

provide an indication of the suitability assessment to a user interface.

20. A tangible, non-transitory, computer-readable medium storing program instructions that cause a device to execute a process comprising:

obtaining, by the device, telemetry data regarding an interaction between a user and an online application that includes performance metrics for network traffic associated with the interaction;

obtaining, by the device, a satisfaction rating provided by the user regarding the interaction;

making, by the device and based on the telemetry data and the satisfaction rating, a suitability assessment as to how suitable the interaction is for training a machine learning model to predict a quality of experience metric for the online application; and preventing, by the device, the telemetry data and satisfaction rating from being used to train the machine learning model, when the suitability assessment indicates that the interaction is unsuitable for training the machine learning model.

*    *    *    *    *